United States Patent Office 2,796,412
Patented June 18, 1957

2,796,412

ORGANOTIN DERIVATIVES OF HYDROXY AND PHENOLIC ACIDS

Elliott L. Weinberg, Long Island City, N. Y., assignor to Metal & Thermit Corporation, New York, N. Y., a corporation of New Jersey No Drawing. Application July 2, 1952,
Serial No. 296,940

17 Claims. (Cl. 260—45.75)

The present invention relates to organotin derivatives of hydroxy substituted organic esters having utility as stabilizing agents for resins and the like, particularly for halogen containing materials, and to processes for manufacturing the same.

In accordance with this invention, the new group of organotin derivatives of hydroxy substituted organic esters may be generally designated as condensation products of organotin compounds with esters of hydroxy substituted alkyl or aryl acids and may be illustrated by the following formula:

1. $R_n Sn[OR'(COO)_m]_{4-n} R''_{m(4-n)}$
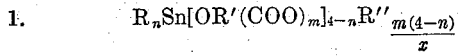

wherein R is an alkyl, aryl or aralkyl group, and R' is a saturated or unsaturated aliphatic hydrocarbon or aromatic hydrocarbon, R'' is an aliphatic hydrocarbon or ether-linked hydrocarbon or aromatic hydrocarbon, $n$ has the value of 2 or 3, $m$ has a value of 1–3, and $x$ is the valence of R'' and has a value of 1–2. Thus R may be any organic radical such as butyl, methyl, lauryl, phenyl, etc. Similarly, R' may be derived from any substituted or unsubstituted hydroxy acid such as ricinoleic, salicylic, tartaric, citric, lactic acids, etc.

More particularly, the compounds of this invention contain the grouping

2.
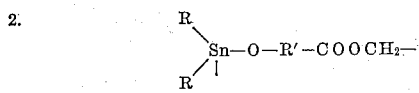

wherein R and R' have the same definitions described above. The oxygen between Sn and R' may be joined to a primary, secondary or tertiary carbon atom in R'. The free bond on the tin atom may be joined to a third R radical or it may be joined to another —O—R'COOCH₂— group. The free bond on the CH₂ may be joined to various groups depending upon what alcohol or glycol was used to esterify the original hydroxy acid. For example, if the original hydroxy acid was esterified with methyl alcohol, the free bond on the CH₂ group is joined to hydrogen, if butyl alcohol was used then the CH₂ is joined to a propyl group, if the hydroxy acid was completely esterified with glycol or polyglycol then the bonds on the CH₂ radicals of two of the aforedefined groupings may be joined together directly or thru a divalent hydrocarbon or ether-linked hydrocarbon radical whose exact nature obviously depends on the particular glycol or polyglycol used.

The organotin derivatives of the present invention are stabilizers for resins, particularly vinyl chloride containing resins, in quantities as low as ½% of the weight of the resin. This stabilizing property is equally applicable to resin plasticizer compositions.

The physical properties of these new compounds can be varied by changing the R' radical and the groups attached to the CH₂ in formula 2, in order to render these organotin derivatives suitable for particular uses. For example, when utilizing these organotin compounds as stabilizing agents for polyvinyl chloride plastics, compounds can be prepared which are compatible with the particular resin-plasticizer composition used.

These compounds may be prepared in any suitable manner. It has been found however that these products may be prepared in high yield by reacting an organotin compound with a hydroxy organic ester, and recovering a reaction product having the above structural formulae. More specifically, an organotin halide selected from the group consisting of mono- and di-halides may be condensed with an hydroxy acid ester in the presence of a neutralizing agent such as sodium hydroxide, sodium carbonate, butyl amine, ammonia, pyridine, etc. These neutralizing substances accept the anion, e. g. chloride, bromide or iodide, formed during the condensation reaction and are not deleterious to the reactants when used in the prescribed manner.

The reaction for the formation of the aforesaid organotin derivatives using organotin mono- and di-halide is clearly illustrated by the following equations:

1.
$R_2SnX_2 + 2HOR'COOCH_2R'' + 2NaOH \longrightarrow$

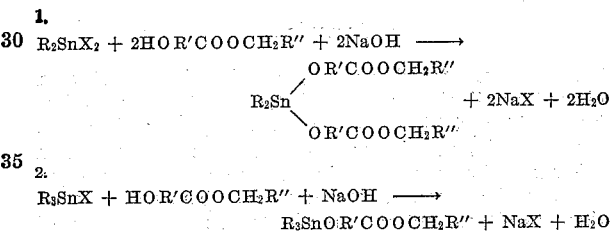

2.
$R_3SnX + HOR'COOCH_2R'' + NaOH \longrightarrow$
$R_3SnOR'COOCH_2R'' + NaX + H_2O$ These equations graphically show that the reaction occurs between the hydroxy radical and the tin halide whereby the halide acid splits off and is instantaneously converted to the salt and a chemical bond is formed between the tin and the oxygen in the formation of the organotin derivatives of the hydroxy acid esters. Equation 1 illustrates the necessity of 2 molecules of the hydroxy acid ester per mole of organotin dihalide, whereas Equation 2 defines the use of one molecule of hydroxy acid ester per molecule of organotin monohalide. The reaction with hydroxy esters of glycols is essentially the same although the balance of the molecule will be rather more complex. It will be obvious that cyclic compounds or polymer type compounds may be formed when the glycol esters are reacted with organotin dihalides.

The organotin oxides are unsuitable as reactants with hydroxy esters to produce these compounds of the instant invention, because the hydroxy ester can be attacked by the tin compound both at the hydroxy group and at the carbonyl group, thereby yielding reaction products totally dissimilar to those hereindefined.

Any suitable reaction temperatures may be employed. It is ordinarily preferred to use elevated temperatures, more particularly above 100° C., although room temperature may also be employed. However, the presence of the water produced by the condensation reaction usually requires an additional heating or refluxing when using room temperature in order to strip said water from the reaction product, though it may be removed in any other suitable manner.

Another embodiment of the instant invention is the use of inert organic solvents as the medium for the reaction, such as toluene, benzene, ether, etc. The presence of such solvent facilitates the desired reaction. The solvent may be eliminated from the reaction product at the completion of the reaction by any suitable means. One method by which this may be accomplished is by vaporizing the solvent under vacuum at elevated temperatures.

According to the procedure of the instant invention these organotin derivatives of hydroxy esters can be obtained in almost theoretical yields. These yields are indicative of the substantially complete utilization of the reactants in the formation of the final reaction products.

The following examples are further illustrative of these organotin derivatives of hydroxy esters and their preparation, and it will be understood that the invention is not limited thereto.

Example I

A mixture of 66.7 grams (.1 mol.) of diethylene glycol diricinoleate, 30.4 gms. (.1 mol.) of dibutyl tin dichloride, 25 gms. of pyridine and 50 gms. of ether was heated in a water bath equipped with a reflux condenser for three hours. The resultant mixture was washed with 5% hydrochloric acid to remove the excess pyridine and pyridine hydrochloride, followed by five aqueous washings and a 25% sodium carbonate wash. During the course of these washings, ether was lost necessitating the addition of benzene to make up the original volume. The resultant mixture was washed three more times with water. The benzene-ether solvent was then evaporated from the reaction product by use of a steam bath and the residual solvent was removed in vacuo, yielding the reaction product, dibutyl tin derivative of diethylene glycol diricinoleate which is a mobile liquid.

Example II

A mixture of 248 gms. methyl ricinoleate, 121 gms. dibutyl tin dichloride, 100 ml. toluene, 32 gms. sodium hydroxide, and 32 ml. water was heated in a liter flask equipped with an agitator, water separator and condenser. After four hours of refluxing, theoretical water was removed and 300 ml. of toluene added. The sodium chloride was filtered out and the filtrate was vacuum stripped of toluene, yielding a pale yellow liyuid containing almost theoretical tin, dibutyl tin O,O' bis (methyl ricinoleate).

Example III 101.3 gms. dibutyl tin dichloride, 102.1 gms. methyl salicylate, 27 gms. sodium hydroxide in 60 ml. of water, and 100 ml. toluene were heated in a flask equipped with an agitator, water separator, and condenser. After 5 hrs. of refluxing, 72 ml. water was removed. The salt was filtered off and the filtrate was stripped of toluene in a steam bath, yielding a slightly pink, low-melting point solid which melted completely at about 100° C. and supercooled in the form of a liquid at room temperature. This solid was dibutyl tin O,O' bis (methyl salicylate).

Example IV 52.6 gms. (.2 mol.) dibutyl tartrate, 30.4 gms. (.1 mol.) dibutyl tin dichloride, and 150 ml. toluene were admixed in a flask equipped with an agitator and a moisture trap. Aqueous sodium hydroxide (8 gms. in 15 ml. water) was added gradually to the agitated solution. 23.5 ml. water was removed by refluxing and the sodium chloride formed during the reaction was removed by filtration. The toluene was stripped in vacuo, yielding a dibutyl tin derivative of dibutyl tartrate, which is a slightly yellow, viscous liquid analyzing 16.5% Sn.

Example V 0.2 mol. tributyl citrate, 0.1 mol. dibutyl tin dichloride and 150 ml. toluene were mixed and reacted in the presence of 0.2 mol. aqueous sodium hydroxide according to the procedure of Example IV. The resultant reaction product, dibutyl tin O,O' bis (tributyl citrate), analyzed 13.0% Sn.

Example VI 0.2 mol. ethyl lactate, 0.1 mol. dibutyl tin dichloride and 150 ml. toluene were mixed and reacted in the presence of 0.2 mol. aqueous sodium hydroxide according to the procedure of Example IV. The resultant reaction product was dibutyl tin O,O' bis (ethyl lactate).

Example VII 0.2 mol, ethyl α-hydroxy iso-butyrate, 0.1 mol. dibutyl tin dichloride and 150 ml. tolnene were mixed and reacted in the presence of 0.2 mol. aqueous sodium hydroxide according to the procedure of Example IV. The resultant reaction product was dibutyl tin O,O' bis (ethyl α-hydroxy iso-butyrate).

Example VIII 0.2 mol. triethyl citrate, 0.1 mol. dibutyl tin dichloride and 150 ml. toluene were mixed and reacted in the presence of 0.2 mol. aqueous sodium hydroxide according to the procedure of Example IV. The resultant reaction product was dibutyl tin O,O' bis (triethyl citrate).

Example IX 0.2 mol. tributyl citrate, 0.2 mol. trimethyl tin chloride and 150 ml. toluene were mixed and reacted in the presence of 0.2 mol. aqueous sodium hydroxide according to the procedure of Example IV. The resultant reaction product was trimethyl tin-O-tributyl citrate.

It has also been discovered and is a feature of this invention that these organotin derivatives of hydroxy esters will function as stabilizers for resin compositions, particularly vinyl chloride containing resin compositions such as vinyl chloride polymer and copolymer resins containing plasticizers, and when intimately dispersed therein, will provide plastic compositions of improved resistance to heat and light deterioration. Excellent films are obtained from the aforesaid plastic compositions which exhibit a high degree of stability. The optimum concentration of the aforesaid organotin derivatives, useful as a stabilizer is about 1–2% based on the weight of the vinyl resin, although ½–10% may also be utilized. The resin composition containing this concentration of stabilizer produces a stable plastic film, which does not darken at elevated temperatures as evidenced by the results of the heat tests in Table I.

The vinyl resins employed were polyvinyl chloride resins. The stabilizer was incorporated into a mixture of 100 parts by weight of resin and 50 parts by weight of dioctyl phthalate plasticizer.

The mixture was then milled for 5 minutes on a two-roll differential speed mill heated to 320 to 325° F., and removed as a sheet. Portions of the sheet were then placed in a single cavity mold (6" by 6" by 40 mils), and preheated to 275° F. The mold was placed on a Preco press and raised to 320° F. under 10,000 pounds total pressure. When the mold reached 320° F. the pressure was increased to 40,000 pounds and held until the temperature reached 330° F. This procedure required five to five and one-half minutes. The mold and press platens were then cooled and the pressed sheet removed.

The pressed sheet was cut into one inch by six-inch strips and placed in clips on a tray so that the strips would hang vertically. The tray was then placed in a circulating air oven held at 320° F. Samples were recovered after one hour, two hours, three hours, and four hours of heat aging. Samples were rated visually, the degree of stability of the vinyl chloride resin film being represented by the depth of colorations.

TABLE I

| | Parts | Molded sheet | 1 hr. | 2 hr. | 3 hr. | 4 hr. |
|---|---|---|---|---|---|---|
| Geon 101 (polyvinyl chloride resin). | 100 | reddish brown | black | | | |
| Dioctyl Phthalate, no stabilizer | 50 | | | | | |
| Geon 101 | 100 | yellow | reddish brown | black | | |
| Dioctyl Phthalate | 50 | | | | | |
| Dibutyl tin dilaurate | 2 | | | | | |
| Geon 101 | 100 | clear, very slight yellow. | clear, slight yellow. | clear, slight yellow. | clear, yellow | brown translucent. |
| Dioctyl Phthalate | 50 | | | | | |
| Stabilizer from Example I | 3.4 | | | | | |
| Geon 101 | 100 | colorless | very slight yellow. | very slight yellow. | slight yellow | slight yellow. |
| Dioctyl Phthalate | 50 | | | | | |
| Stabilizer from Example II | 3 | | | | | |
| Geon 101 | 100 | very slight yellow | slight yellow | yellow | yellow | yellow. |
| Dioctyl Phthalate | 50 | | | | | |
| Stabilizer from Example III | 1.7 | | | | | |
| Ultron 300 (polyvinyl chloride resin). | 100 | yellow | yellow | do | brown | |
| Dioctyl Phthalate | 50 | | | | | |
| Stabilizer from Example IV | 2.2 | | | | | |
| Ultron 300 | 100 | light amber | amber | amber | dark amber | |
| Dioctyl Phthalate | 50 | | | | | |
| Stabilizer from Example V | 2.75 | | | | | |

This table discloses the stabilizing activity of these organotin derivatives of polyhydric alcohols in comparison to a resin without such stabilizer and with known stabilizers such as dibutyl tin dilaurate.

Other uses of the organotin derivatives are as stabilizers for other chlorinated materials, as rubber accelerators, rubber anti-oxidants, lube oil additives, and polymerization accelerators.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A compound having the structural formula:

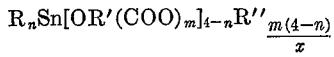

wherein R is selected from the group consisting of alkyl and aryl radicals, R' is selected from the class consisting of saturated and unsaturated aliphatic hydrocarbons and aromatic hydrocarbons, R" is selected from the class consisting of aliphatic hydrocarbons, ether-linked hydrocarbons and aromatic hydrocarbons, $n$ has a value of 2 to 3, $m$ has a value of 1–3, and $x$ has a value of 1–2.

2. Dibutyl tin derivative of diethylene glycol diricinoleate.
3. Dibutyl tin O,O' bis (methyl ricinoleate).
4. Dibutyl tin O,O' bis (methyl salicylate).
5. Trimethyl tin-O-tributyl citrate.
6. A method of preparing organotin derivatives of hydroxy esters which comprises reacting an organotin halide selected from the class consisting of alkyl and aryl halides with an hydroxy organic acid ester selected from the class consisting of saturated and unsaturated aliphatic and aromatic acids in the presence of a neutralizing agent, and recovering said organotin reaction products.
7. A method of preparing organotin derivatives of hydroxy esters which comprises reacting about one mole of an organotin dihalide selected from the class consisting of alkyl and aryl halides with about two moles of an hydroxy organic acid ester selected from the class consisting of saturated and unsaturated aliphatic and aromatic acids in the presence of a neutralizing agent, and recovering said organotin reaction products.
8. A method of preparing organotin derivatives of hydroxy esters which comprises reacting equimolecular amounts of an organotin monohalide selected from the class consisting of alkyl and aryl halides with an hydroxy organic acid ester selected from the class consisting of saturated and unsaturated aliphatic and aromatic acids in the presence of a neutralizing agent, and recovering said organotin reaction products.

9. A method of preparing organotin derivatives of hydroxy esters which comprises reacting an organotin halide selected from the class consisting of alkyl and aryl halides with an hydroxy organic acid ester selected from the class consisting of saturated and unsaturated aliphatic and aromatic acids in the presence of a neutralizing agent, and an inert organic solvent, and recovering said organotin reaction products.

10. A stable vinyl resin composition containing intimately dispersed therein an organotin derivative selected from the class consisting of alkyl and aryl halides of a hydroxy substituted organic acid ester selected from the class consisting of saturated and unsaturated aliphatic and aromatic acids as a stabilizing agent.

11. A stable vinyl resin composition containing intimately dispersed therein about 0.5–10% of an organotin derivative selected from the class consisting of alkyl and aryl halides of a hydroxy substituted organic acid ester selected from the class consisting of saturated and unsaturated aliphatic and aromatic acids as a stabilizing agent.

12. A stable vinyl chloride resin composition containing intimately dispersed therein about 1–2% of an organotin derivative selected from the class consisting of alkyl and aryl halides of a hydroxy substituted organic acid ester selected from the class consisting of saturated and unsaturated aliphatic and aromatic acids as a stabilizing agent.

13. A method of preparing organotin derivatives of hydroxy esters having the formula:

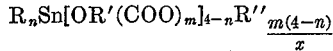

wherein R is selected from the group consisting of alkyl and aryl radicals, R' is selected from the class consisting of saturated and unsaturated aliphatic hydrocarbons and aromatic hydrocarbons, R" is selected from the class consisting of aliphatic hydrocarbons, ether-linked hydrocarbons and aromatic hydrocarbons, $n$ has a value of 2 to 3, $m$ has a value of 1–3, and $x$ has a value of 1–2, which comprises reacting an organotin halide with an hydroxy organic acid ester in the presence of a neutralizing agent, and recovering said organotin reaction products.

14. A stable vinyl resin composition containing intimately dispersed therein a compound having the structural formula:

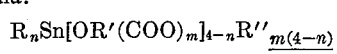

wherein R is selected from the group consisting of alkyl and aryl radicals, R' is selected from the class consisting of saturated and unsaturated aliphatic hydrocarbons and aromatic hydrocarbons, R" is selected from the class consisting of aliphatic hydrocarbons, ether-linked hydrocarbons and aromatic hydrocarbons, $n$ has a value of 2 to 3, $m$ has a value of 1–3, and $x$ has a value of 1–2 as a stabilizing agent.

15. As a stabilizer for a resin an organotin derivative of an ester of a hydroxy acid, said hydroxy acid being selected from the class consisting of aliphatic and aromatic hydrocarbons containing at least one hydroxyl and at least one carboxyl substituent, the organotin moiety of said stabilizer being selected from the class consisting of alkyl, aryl and aralkyl tin radicals, said organotin moiety replacing hydrogen of the hydroxyl groups of said hydroxy acid.

16. A compound having the structural formula:

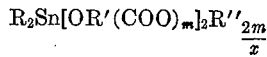

wherein R is selected from the group consisting of alkyl and aryl radicals, R' is selected from the class consisting of saturated and unsaturated aliphatic hydrocarbons and aromatic hydrocarbons, R'' is selected from the class consisting of aliphatic hydrocarbons, ether-linked hydrocarbons and aromatic hydrocarbons, $m$ has a value of 1–3 and $x$ has a value of 1–2.

17. A compound having the structural formula:

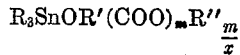

wherein R is selected from the group consisting of alkyl and aryl radicals, R' is selected from the class consisting of saturated and unsaturated aliphatic hydrocarbons and aromatic hydrocarbons, R'' is selected from the class consisting of aliphatic hydrocarbons, ether-linked hydrocarbons and aromatic hydrocarbons, $m$ has a value of 1–3, and $x$ has a value of 1–2.

References Cited in the file of this patent
UNITED STATES PATENTS

| | | |
|---|---|---|
| 2,252,664 | Reiff et al. | Aug. 12, 1941 |
| 2,476,422 | Leininger | July 19, 1949 |
| 2,479,918 | Fincke et al. | Aug. 23, 1949 |
| 2,604,483 | Mack et al. | July 22, 1952 |
| 2,631,990 | Mack et al. | Mar. 17, 1953 |
| 2,648,650 | Weinberg et al. | Aug. 11, 1953 |
| 2,700,675 | Mack et al. | Jan. 25, 1955 |

OTHER REFERENCES

Lowy et al.: Introduction to Organic Chemistry, 6th edition (1946), page 213.